United States Patent [19]

Nakagawa et al.

[11] Patent Number: 5,687,823
[45] Date of Patent: Nov. 18, 1997

[54] ELECTROMAGNETIC CLUTCH

[75] Inventors: Juneichi Nakagawa, Nagoya; Masahiro Kinoshita; Yutaka Ito, both of Kariya; Kimio Suzuma, Toyoake; Hidetaka Shingai, Anjo, all of Japan

[73] Assignee: Nippondenso Co., Ltd., Kariya, Japan

[21] Appl. No.: 623,199

[22] Filed: Mar. 28, 1996

[30] Foreign Application Priority Data

| Mar. 29, 1995 | [JP] | Japan | 7-071926 |
| Sep. 27, 1995 | [JP] | Japan | 7-249830 |

[51] Int. Cl.$^6$ ............................ F16D 27/04
[52] U.S. Cl. ............ 192/84.961; 310/68 C; 310/92
[58] Field of Search .......... 192/84.961; 310/92, 310/68 C, 71, 78, 104

[56] References Cited

U.S. PATENT DOCUMENTS

| 4,045,761 | 8/1977 | Peterson | 310/68 C X |
| 4,771,198 | 9/1988 | Aschberger et al. | 310/68 C |

FOREIGN PATENT DOCUMENTS 57-51025  3/1982  Japan .

*Primary Examiner*—Andrea L. Pitts
*Attorney, Agent, or Firm*—Cushman, Darby & Cushman IP Group of Pillsbury Madison & Sutro LLP

[57] ABSTRACT

An electromagnetic clutch for a compressor in an air conditioning apparatus for an automobile. A temperature fuse unit 13 is arranged in an electric circuit for an electromagnetic coil of the clutch for opening the circuit when a temperature increase is generated due to an occurrence of seizing. The temperature fuse unit 13 is arranged in a coil housing 4 at a location adjacent a frictional surface 2a of a rotor of the clutch and an inner sleeve portion 4a of the coil housing 4. During normal operation of the clutch, heat around the electromagnetic coil is transmitted to the coil housing of an increased heat conductivity, made of a magnetizing metal materials, thereby preventing the temperature around the temperature fuse 13 from being increased. At an occurrence of seizing of the compressor, heat generated by a sliding contact between an armature 8 and rotor 2 is quickly transmitted to the temperature fuse 13 via an end of the inner sleeve portion 4b of the coil housing 4, which allows the temperature fuse to be instantly melted and thus opened.

12 Claims, 14 Drawing Sheets

Fig.7-(a)
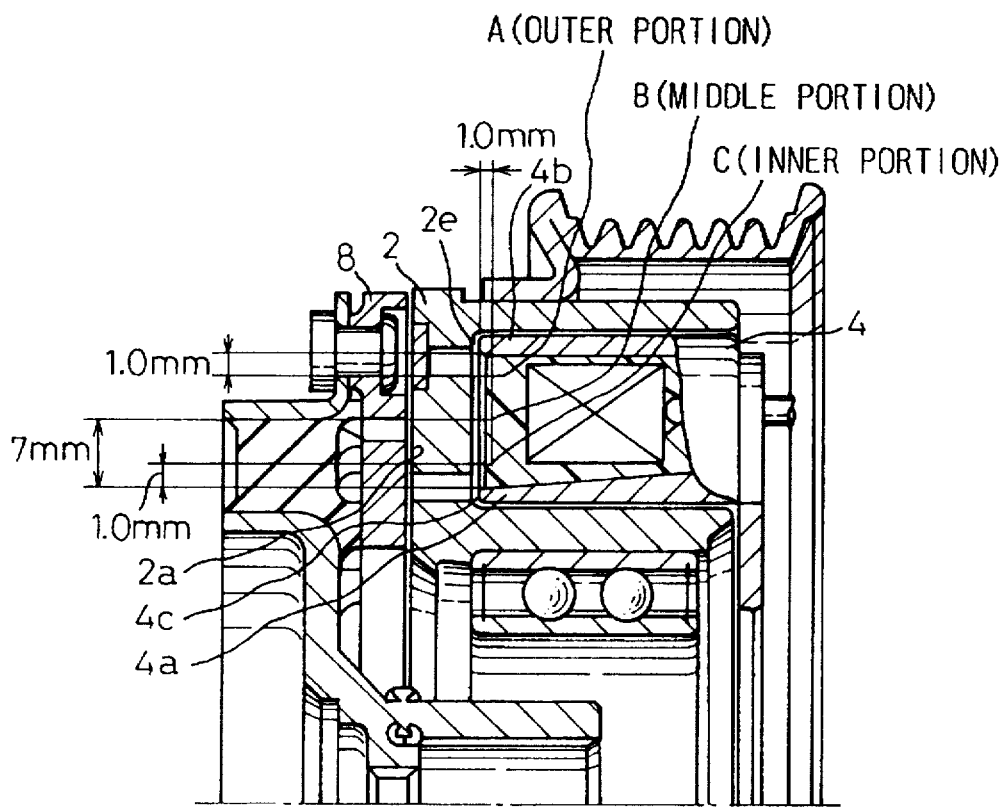
Fig.7-(b)
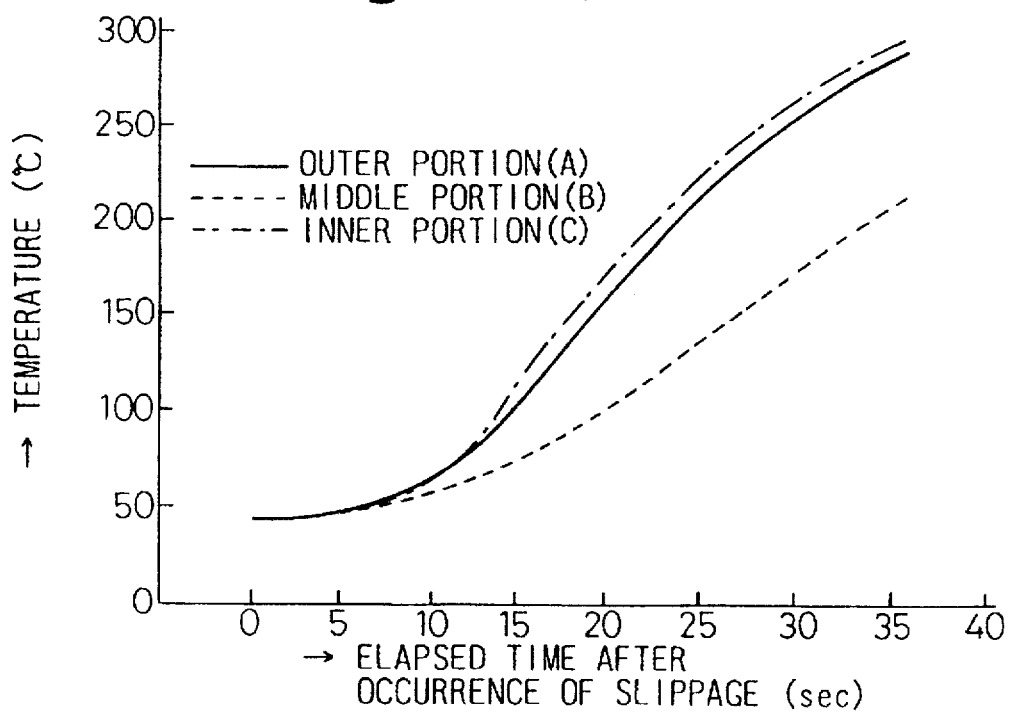

Fig.8-(a)
COMPARATIVE TEST
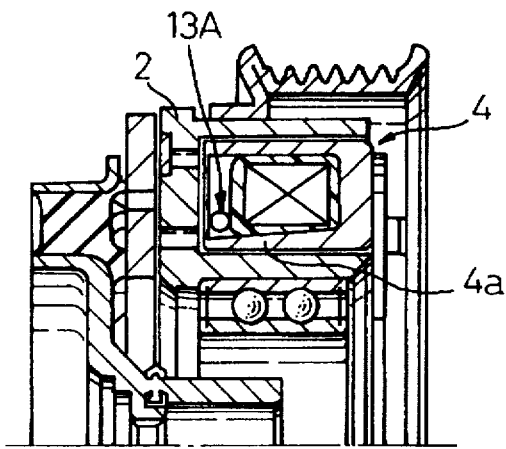
Fig.8-(b)
PRESENT INVENTION
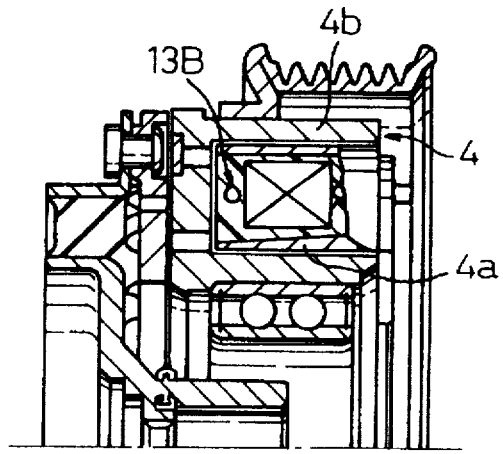
Fig.8-(c)
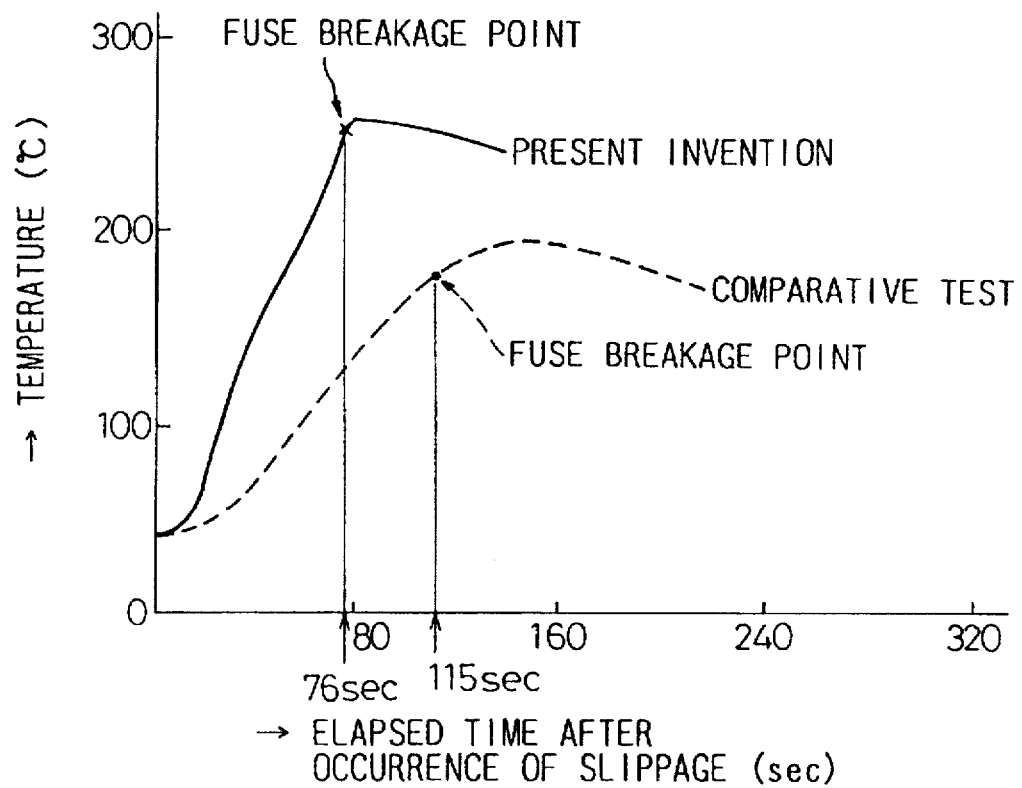

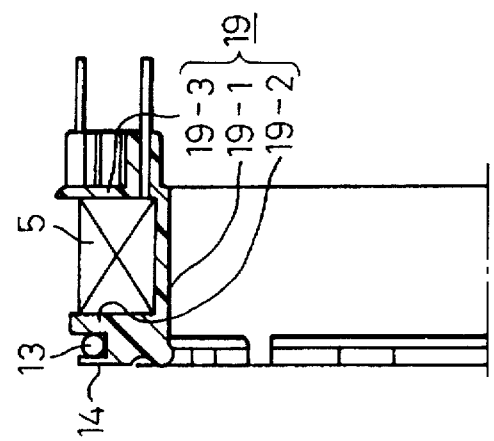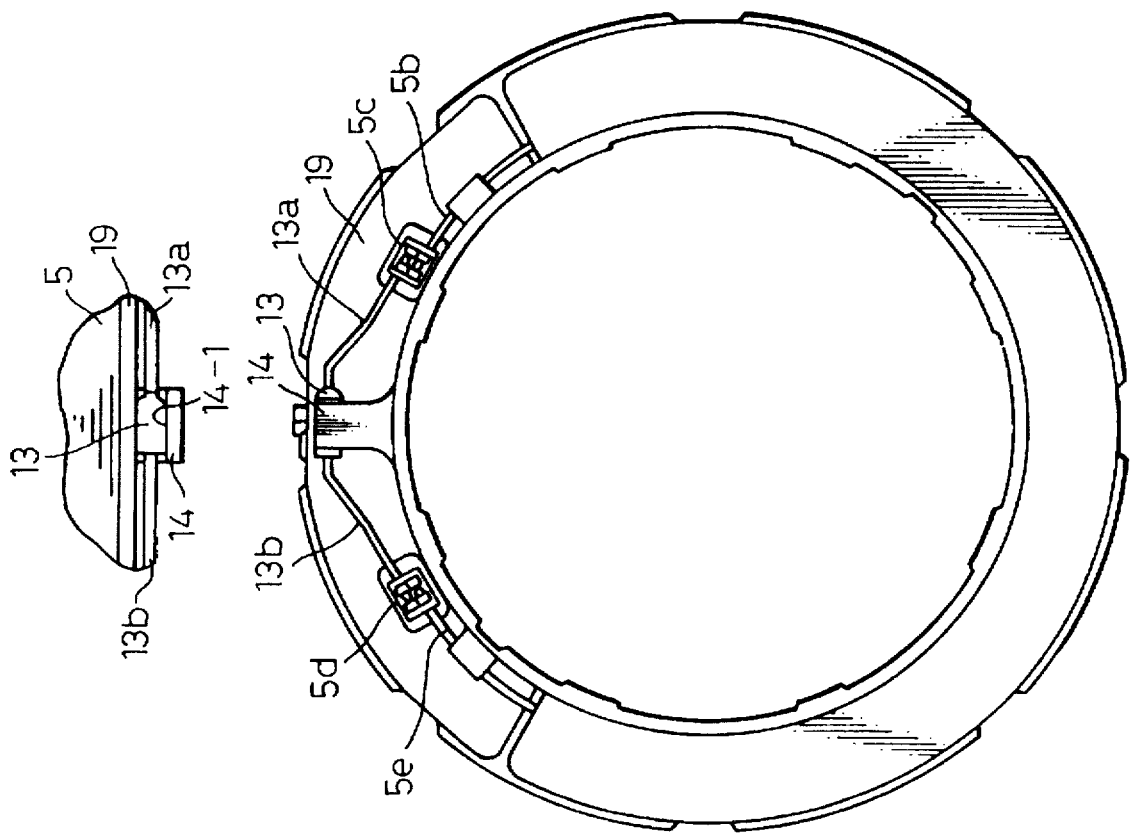

ELECTROMAGNETIC CLUTCH

BACKGROUND OF THE INVENTION

1. Field of the Invention

The present invention relates to an electromagnetic clutch for selective transmission of a rotating movement from a rotating source to a rotary device. The electromagnetic clutch according to the present invention can be suitably used for selective transmission of a rotating movement from an internal combustion engine to a compressor in a refrigerant recirculating system for an air conditioning apparatus for a vehicle.

2. Description of Related Art

In an air conditioning apparatus for a vehicle provided with an internal combustion engine, an electromagnetic clutch is provided for selective transmission of a rotating movement of a crankshaft of the engine to a compressor of the air conditioning apparatus. Namely, an engagement of the electromagnetic clutch causes the rotating movement from the crankshaft of the engine to be transmitted to the compressor via a belt transmission device. Conversely, a disengagement of the clutch prevents the rotating movement from being transmitted to the compressor.

A malfunction such as a seizure of the compressor causes its rotating shaft to be locked, thereby causing the belt to be overloaded, which may cause the belt to be damaged. Once the belt is damaged, a rotating movement from the crankshaft of the internal combustion engine cannot be transmitted to various engine auxiliary units, such as a water pump for engine cooling water and an alternator for charging a battery, which may cause the engine to stop. Thus, a solution for preventing the belt from being overloaded is essential.

In order to combat to this problem, the solution of the prior art is as follows. Namely, a clutch has a rotor which is in connection with a crankshaft of the internal combustion engine so that the rotor is rotated with the crankshaft. An armature is arranged to face the rotor, and an electromagnetic coil is provided for generating an electromagnetic force for causing the armature to be in face to face contact with the inlet rotor, thereby transmitting a rotating movement from the inlet rotor to the armature. However, when seizing occurs in a part of the compressor, such as a bearing, the armature is prevented from being rotated, so that a relative sliding movement of the rotor with respect to the armature occurs, while the rotor and armature are in a face to face contacted condition, thereby causing the temperature at the contacted area to be locally and highly increased. Thus, in the prior art solution, such a local increase in the temperature is used for detecting the locked condition. Namely, a temperature fuse unit is arranged adjacent the location where the relative slide movement has occurred between the rotor and the armature. The temperature fuse unit is arranged in series with respect to the solenoid coil of the electromagnetic clutch. An increase in the temperature due to an occurrence of seizing in the part of the compressor causes the fuse to melt, which causes the closed circuit to the solenoid coil to be opened, thereby de-energizing the solenoid. As a result, the belt is freed from the load caused by the locking, thereby preventing the belt from being overloaded.

An example of this type of prior art using a temperature fuse is disclosed in Japanese Un-Examined Patent Publication No. 57-51025, where a spool for a solenoid coil is fixed to a coil housing, and the spool has a portion faced with the rotor, where a temperature fuse is arranged.

According to the test conducted by the inventors it was found that the construction in the above '025 patent is defective in the following points. Namely, in the prior art construction, the temperature fuse is covered by a member made of a resin material for the fastening of the coil as well as the coil spool while obtaining an electrically insulating function. As a result, an effective emission of heat generated in the environment of the temperature fuse can not be obtained. Namely, heat generated when the electromagnetic coil is energized during a normal operation of the compressor is likely to be maintained in the environment around the coil, which causes the temperature of the fuse to be higher than its predetermined melting breakage temperature. In this situation, the temperature fuse can erroneously melt, which causes the clutch to be disengaged. In other words, the compressor (air conditioning apparatus) is erroneously stopped irrespective of the fact that seizing has not actually occurred.

Furthermore, in the prior art construction, a transfer of heat generated at the contacting area between the rotor and armature upon the occurrence of seizing is prevented by the resin cover member. In other words, an effective transmission of the heat generated at the contacting area can not be obtained, which prolongs the time to the occurrence of melting of the temperature fuse, which reduces the response speed of the system. Due to such a reduction in the response speed, melting of the temperature fuse is delayed, thereby causing a temperature of a bearing unit (ball bearing) to be increased, thereby generating seizing.

SUMMARY OF THE INVENTION

An object of the present invention is to provide an electromagnetic clutch capable of reducing an erroneous operation of the temperature fuse while increasing the response speed of melting of the temperature fuse when slippage occurs in the electromagnetic clutch.

In the invention, a temperature fuse unit is arranged in a coil housing at a location adjacent the frictional surface of a first rotating member and also adjacent a wall of the coil housing.

A resin member for holding the temperature fuse in the coil housing is provided.

A fuse holder for holding the temperature fuse in the coil housing is also provided.

In another aspect of the invention, the fuse holder is mounted to a spool on which the electromagnetic coil is wound.

Also in another aspect of the invention, the temperature fuse is arranged adjacent to an inner sleeve portion of the coil housing of a double cylindrical shape, and the temperature fuse is situated at a distance smaller than 5.0 mm from both an outer surface of the inner sleeve portion and an end surface of the coil housing.

In yet another aspect of the invention, the temperature fuse is arranged adjacent an outer sleeve portion of the coil housing of a double cylindrical shape, and the temperature fuse is situated at a distance smaller than 5.0 mm from both of an inner surface of the outer sleeve portion and an end surface of the coil housing.

In a further aspect of the invention, protection tubes are provided for lead wires from the temperature fuse unit, and the protection tubes are arranged to be overlapped with the fuse holder.

In still another aspect the invention, bent portions are provided in lead wires from the temperature fuse unit.

According to the inventions in claims 1 to 10, the heat generated from the electromagnetic coil when energized during normal operation of a driven side device such as a compressor is quickly emitted to the coil housing made of ferromagnetic metal of a greater heat conductivity than the resin material due to the fact that the temperature fuse unit is located adjacent to the wall of the coil housing, thereby obtaining a lower temperature in the atmosphere around the temperature fuse when compared with the case where the temperature fuse is located at the middle of the resin member of a smaller value of a heat conductivity. As a result, a possibility that the heat generated from the temperature fuse causes the temperature fuse to be melted is highly reduced. In other words, a chance of an erroneous operation of the temperature fuse can be reduced.

On the other hand, upon a generation of seizing due to the fact that the driven side device is subjected to seizure, the temperature is highly increased due to the frictional heat at a sliding contact area between the armature and the driven rotating member. A quick increase in a temperature is obtained at an end portion of the coil housing adjacent to a frictional surface of the driven rotating member due to the fact that the coil housing has a thermal conductivity higher than that of the resin member. The temperature fuse can effectively receive the heat via the end surface of the coil housing, thereby obtaining a quick response to the increase in the temperature with reference to the increase in the temperature at the driven rotating member. Thus, the temperature of the fuse is quickly increased to its melting temperature, thereby opening the circuit to the electromagnetic coil. Thus, the problem that a seizing of a bearing unit of the electromagnetic clutch occurs due to a temperature increase prior to the melting of the temperature fuse, is prevented.

BRIEF EXPLANATION OF ATTACHED DRAWINGS

Figure 1:
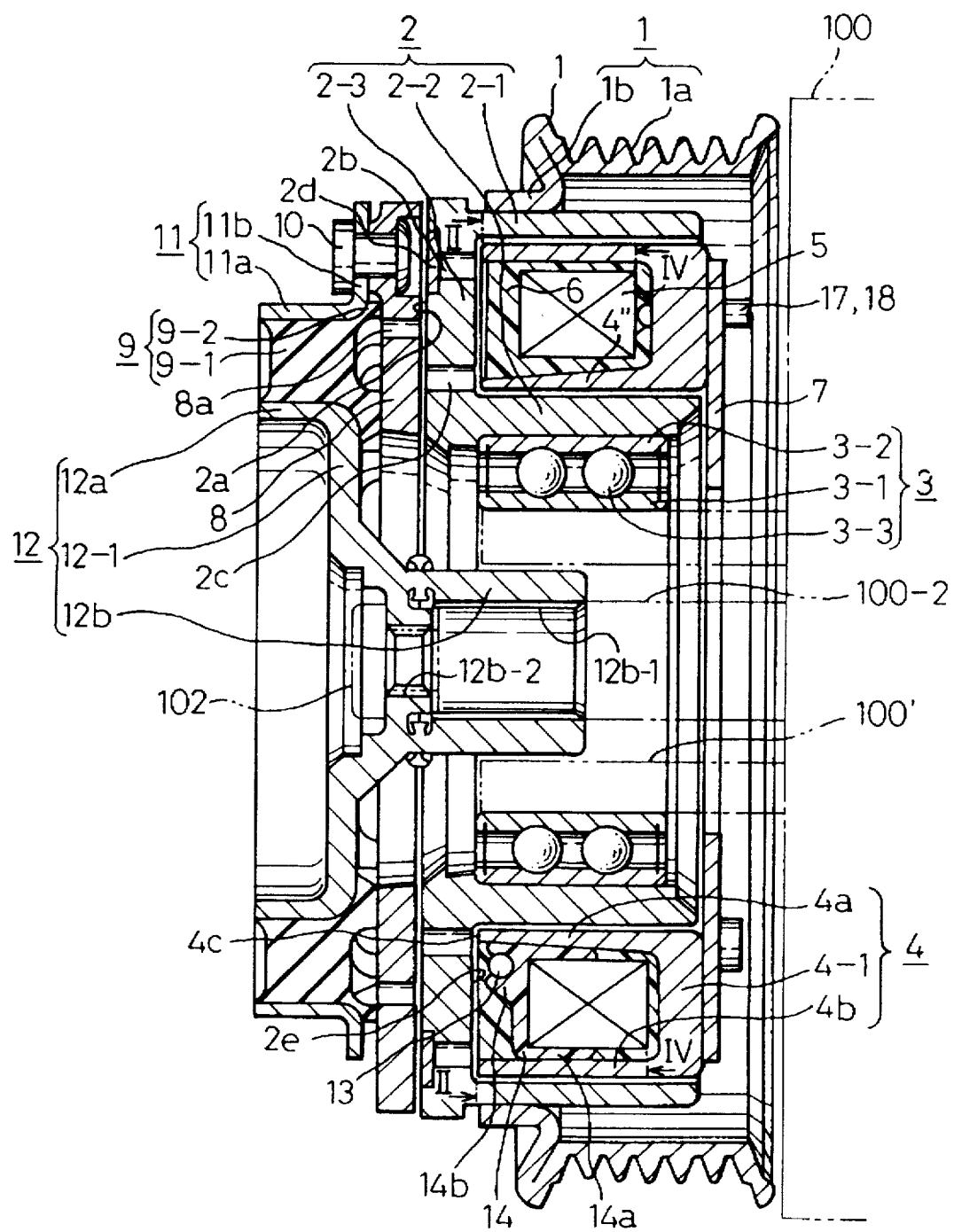
FIG. 1 is a longitudinal cross-sectional view of an electromagnetic clutch according to the first embodiment of the present invention.

FIG. 7-(a) is a part of the electromagnetic coil in FIG. 1 and illustrates positions of measurement of the temperature of the coil housing.

FIG. 7-(b) is a graph illustrating the relationship between time, from a commencement of a slippage, and the temperature.

FIG. 8-(a) is similar to FIG. 7-(a) but illustrates a location of the measurement of the temperature increase, corresponding to a location of a temperature fuse in a prior art.

FIG. 8-(b) is similar to FIG. 8-(a) but illustrates a location of the measurement of the temperature increase, corresponding to a location of a temperature fuse in the present invention.

FIG. 8-(c) shows a graph illustrating relationships between a time from a commencement of a slippage and the temperature increase in the arrangements in FIGS. 8-(a) and (b).

Figure 9:
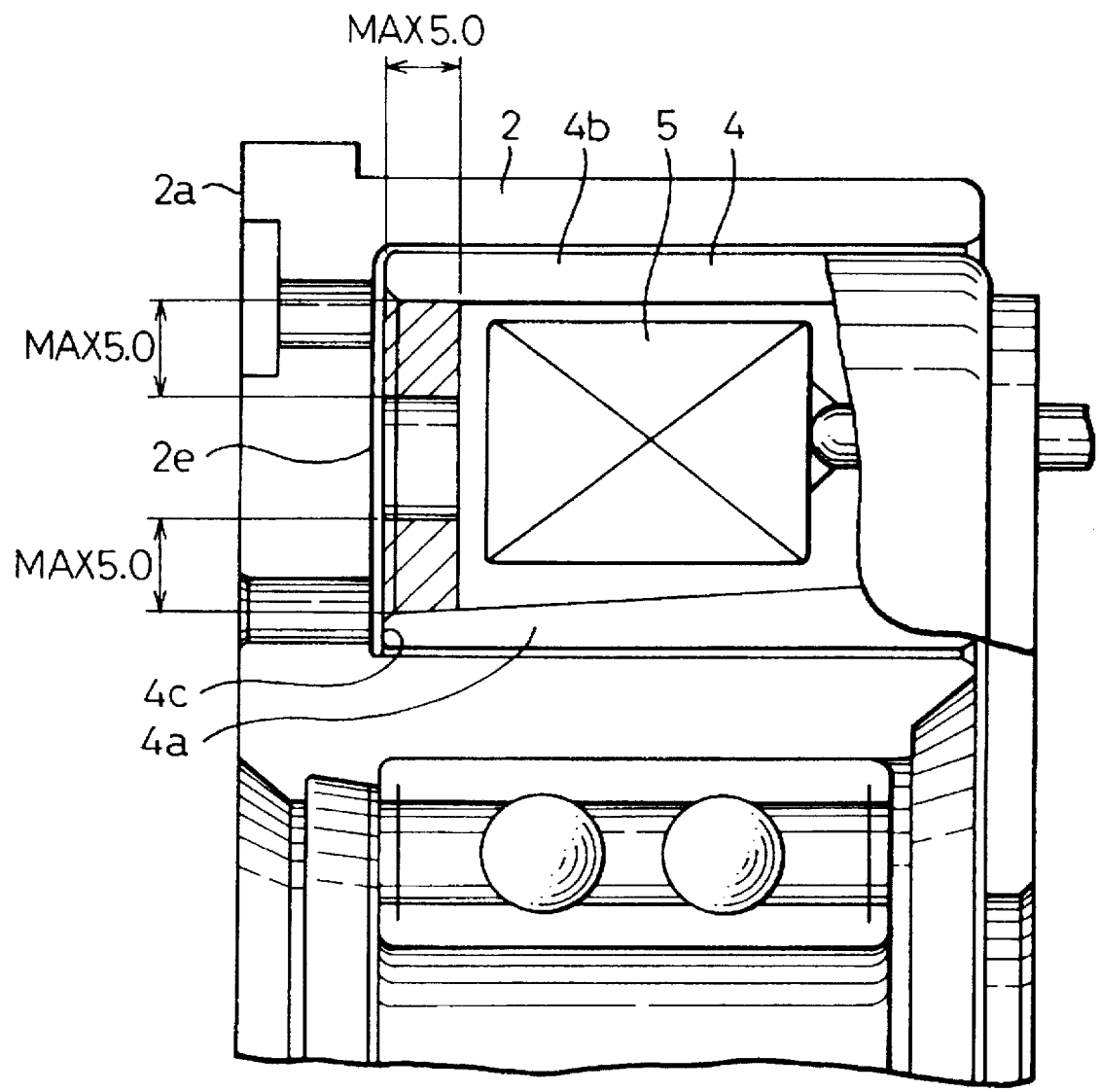

FIG. 9 is similar to FIG. 7-(a) but illustrates the desired regions of portions of the coil housing where the temperature fuse can be arranged.

FIGS. 10-(a), (b) and (c) show top, side and cross sectional views, respectively, of the electromagnetic coil with a spool in a second embodiment.

Figure 11:
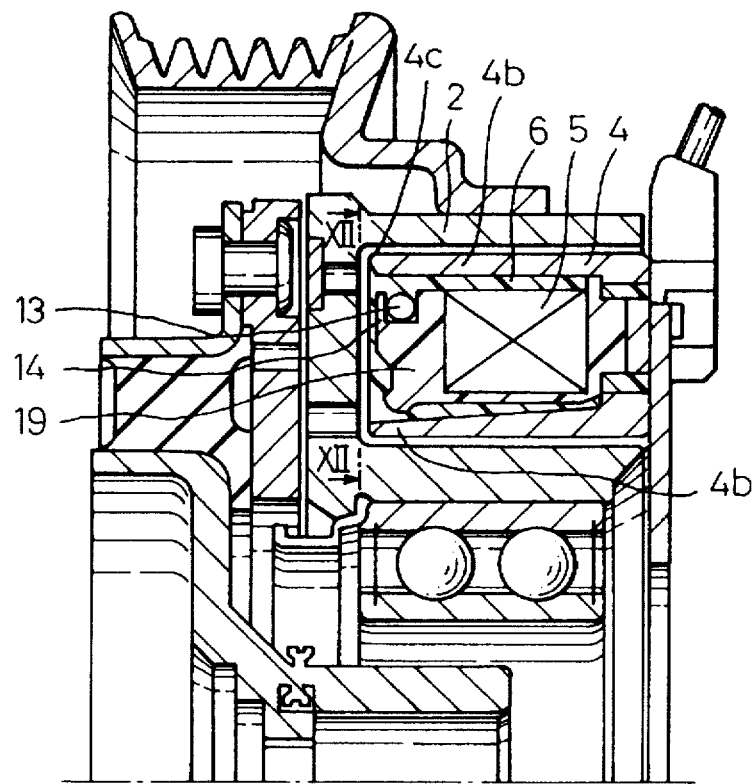

FIG. 11 is a detail cross sectional view of the electromagnetic clutch in the second embodiment.

Figure 12:
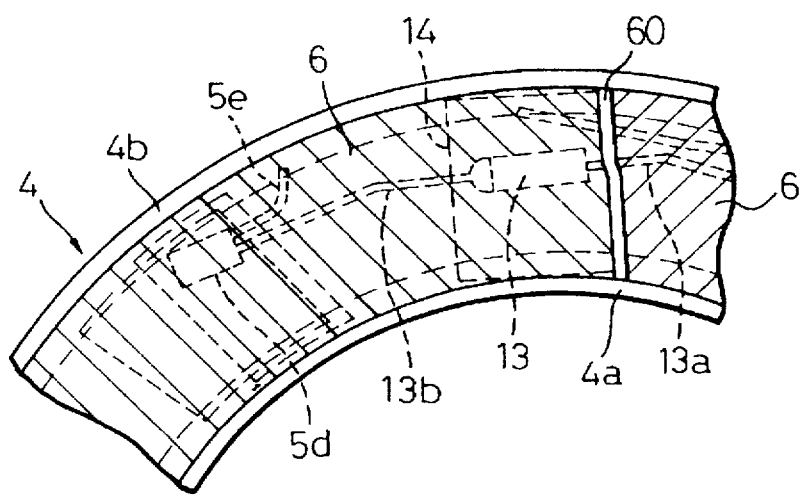

FIG. 12 is a view taken along line XII—XII in FIG. 11 and illustrates a problem to be solved by the second embodiment.

Figure 13:
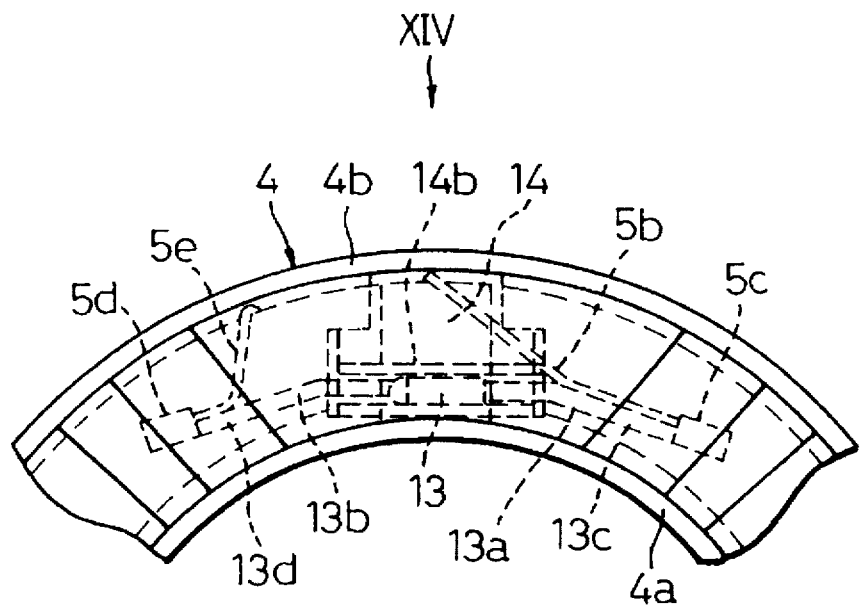

FIG. 13 is similar to FIG. 12 but illustrates a third embodiment.

Figure 14:
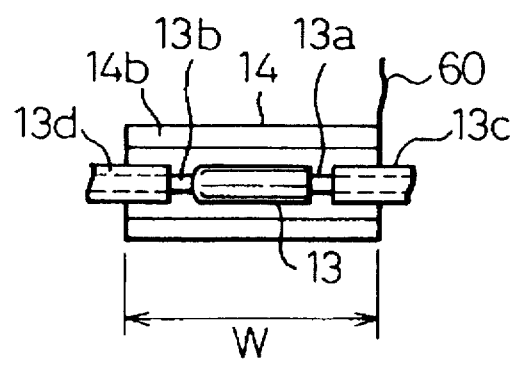

FIG. 14 illustrates a relationship between the fuse holder and protection tubes seen along a line XIV in FIG. 13.

Figure 15:
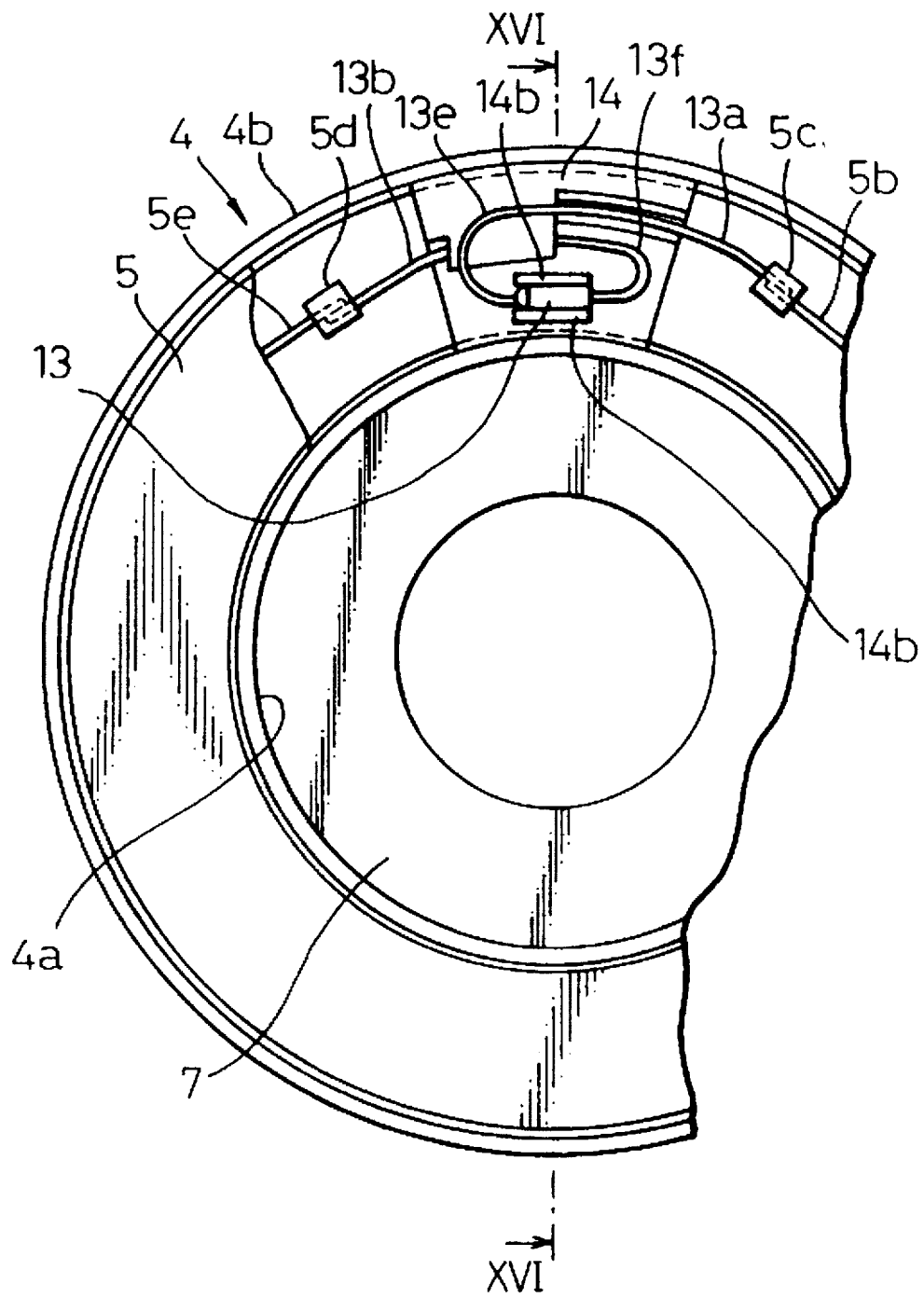

FIG. 15 is front view of the coil housing in a fourth embodiment.

Figure 16:
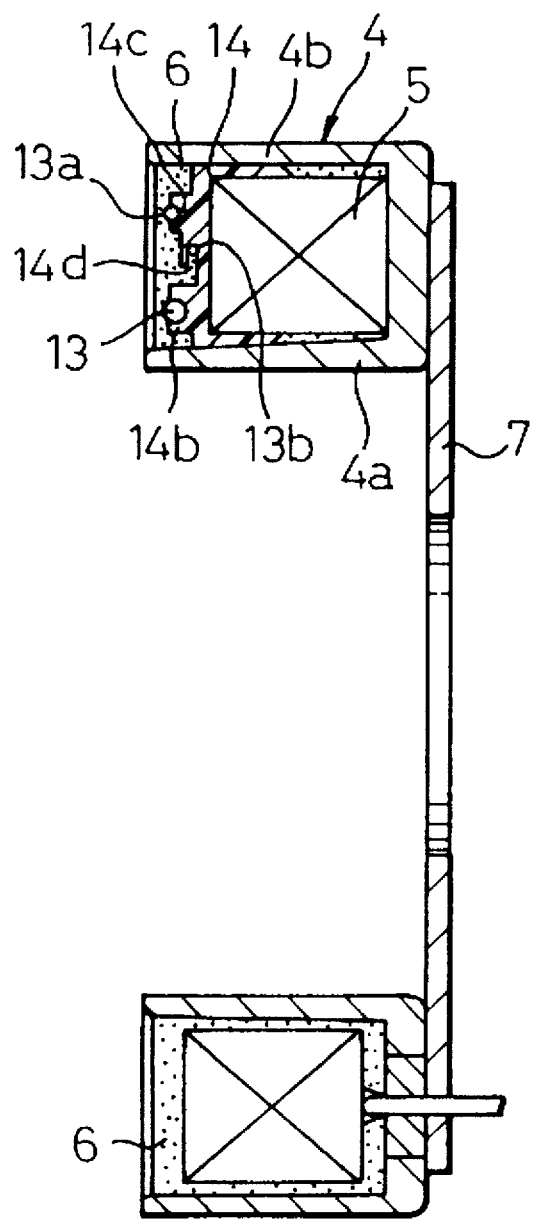

FIG. 16 is a cross sectional view taken along line XVI—XVI in FIG. 15.

Figure 17:
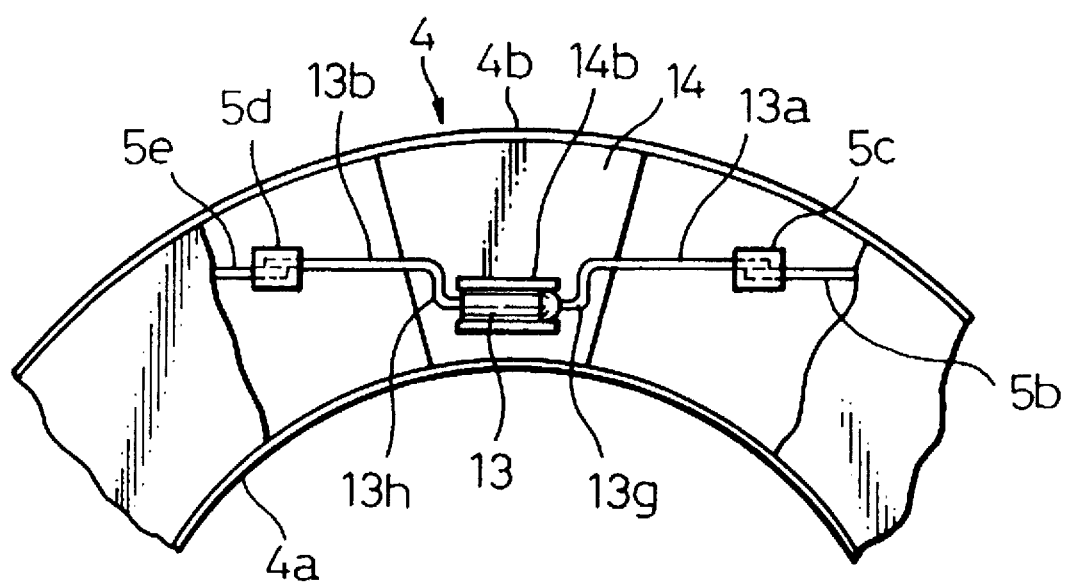

FIG. 17 is front view of the coil housing which illustrates an arrangement of the temperature fuse in a fifth embodiment.

DESCRIPTION OF PREFERRED EMBODIMENTS

First Embodiment

Figure 2:
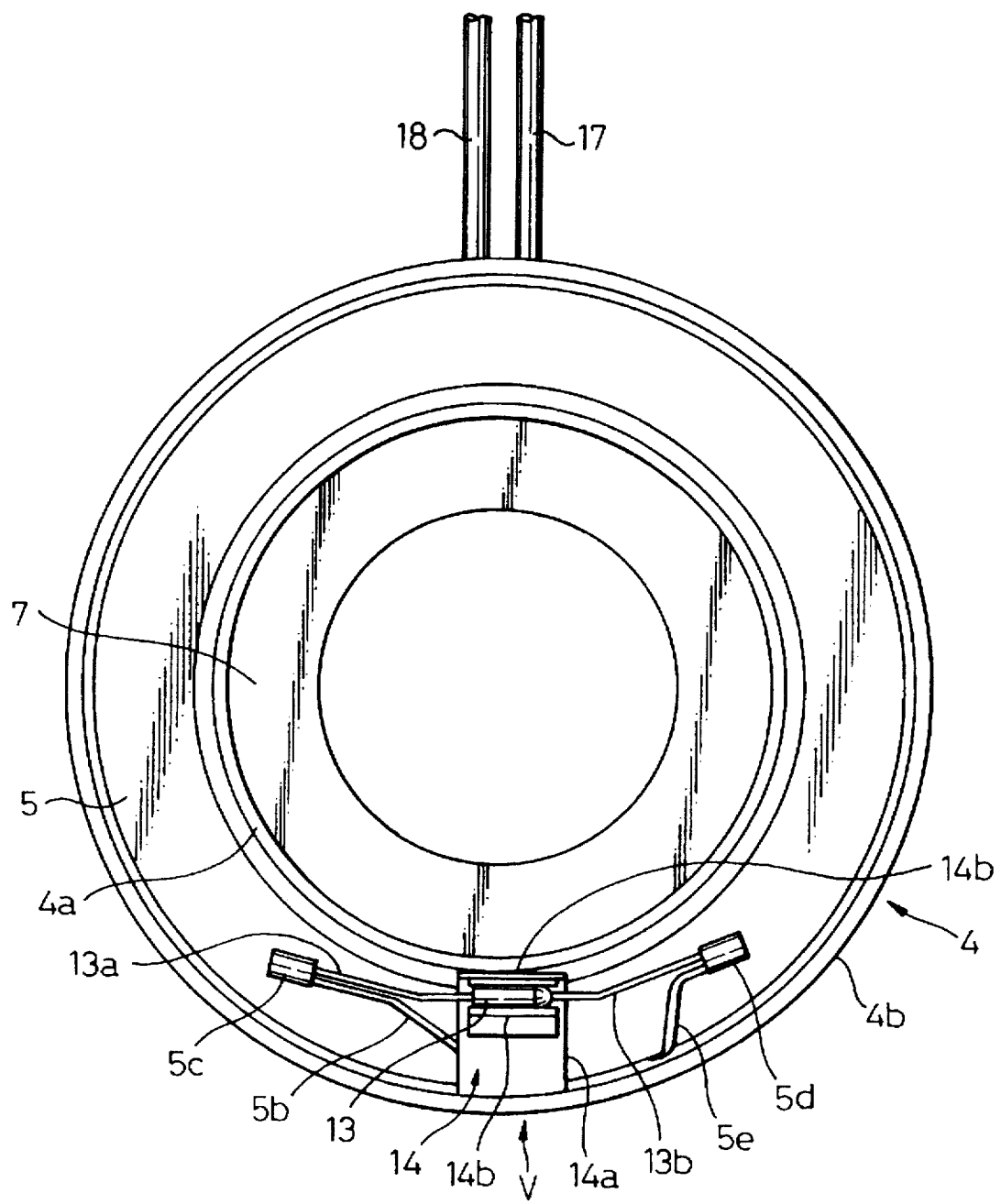
FIG. 2 is a front view of a coil housing taken along line II—II in FIG. 1.

In FIGS. 1 and 2, a reference numeral 1 denotes a drive pulley which is for kinematic connection with a crankshaft (not shown) of an internal combustion engine via a belt (not shown), so that a rotating movement of the pulley 1 is obtained. The pulley 1, made of a steel-based material, is constructed by a pulley portion 1a having a plurality of grooves of a V cross sectional shape, with which the belt is engaged and by a base portion 1b of a diameter smaller than that of the pulley portion 1a and extending integrally from the pulley portion 1a.

A reference numeral 2 denotes a drive rotor of a substantially C-cross sectional shape, which is made from a steel base material (ferromagnetic substance). The drive rotor 2 is constructed by an outer tubular portion 2-1, an inner tubular portion 2-2, and a disk shaped portion 2-3, and these portions 2-1, 2-2 and 2-3 are formed integrally. The base portion 1b of the pulley 1 is inserted to the outer tubular potion 2-1 of the rotor 2 and is firmly fixed thereto by a suitable means such as a welding.

Arranged inwardly of the rotor 2 is a bearing unit 3, which is constructed by an inner race 3-1, an outer race 3-2 and two rows of circumferentially spaced balls 3-3 arranged between the inner and outer races 3-1 and 3-2. The inner race 3-1 is firmly fitted to a tubular boss portion 100' which is an integral portion of a front housing 100 of a compressor which is schematically shown by a phantom line. The outer race 3-2 is firmly fitted to the inner tubular portion 2-2 of the rotor 2. As a result, the rotor 2 is rotatable with respect to the compressor housing 100.

In the embodiment, the compressor is for an air conditioning apparatus for a vehicle and is located in a refrigerating system for obtaining compression of a refrigerant gas.

A reference numeral 4 denotes a coil housing which functions as a stationary pole member. The coil housing 4 is made of a steel based material (ferromagnetic material) and is formed as a substantially C-cross sectional shape. Namely, the coil housing 4 is constructed by an inner ring 4a, an outer ring 4b and a disk portion 4-1 connecting the inner and outer rings 4a and 4b with each other, so that an annular channel 4", of substantially C-cross sectional shape is created between the rings 4a and 4b and the disk 4-1.

Arranged in this annular space is an electromagnetic coil 5 which is covered in an electrically insulating manner by a covering 6 made of a resin material. The coil 5 is constructed by a spool and a winding, which are not shown for the sake of simplicity. In order to obtain this electrically insulating structure, the coil 5 is first inserted to the space inside the housing 4, while a gap is left between the housing 4 and the coil 5. Then, a resin material such as an epoxy resin or unsaturated polyester resin, of which molding can be done at a relatively low molding temperature such as between 130° to 140° C., is filled in the gap.

An arrangement of the coil housing 4 in the rotor 2 is such that the coil housing 4 is stored in the C-cross sectional shaped space of the rotor 2 while a small gap is left between the rotor 2 and the housing 4, so that a rotating movement of the rotor 2 is not hindered by the housing 4 which is itself stationary connected to the compressor housing. Namely, a stay member 7 is fixedly connected, by a suitable means such as a spot welding to a rear end surface of the coil housing 4. The stay member 7 is fixedly connected to the compressor housing 100.

As shown in FIG. 1, formed on the friction disk 2-3 of the rotor 2 which extends radially, are a plurality of radially spaced magnetic flux separation grooves 2b and 2c of an arc shape. Furthermore, at locations of the friction disk 2-3 of the rotor 2 on the radially outer magnetic flux separation grooves 2b, friction pads 2d are arranged for increasing a transmission torque when an engagement of the clutch occurs.

Reference numeral 8 denotes an armature which is arranged generally to face a frictional surface 2a of the rotor 2. The armature 8 is formed as an annular plate and is made from a steel-based material (ferromagnetic material). An elastic member 9 is provided for generating an elastic force which causes the armature 8 to be, at a small distance, spaced from the friction surface 2a of the rotor 2 when the electromagnetic coil 5 is de-energized. The armature 8 is also formed with magnetic flux separation grooves 8a.

Through the rotor 2, the coil housing 4 and the armature, a closed loop of a magnetic flux is generated when the electromagnetic coil 5 is energized.

A reference numeral 11 denotes an armature holder for holding the armature 8. The armature holder 11 is constructed by a tubular portion 11a and a flange portion 12b extending radially from the tubular portion 11a. The flange portion 11b is arranged to face the armature 8. Furthermore, the flange portion 11b and the armature 8 are formed with aligned holes, to which rivets 10 made of a steel based material are inserted and crimped for fixing the armature 8 to the holder 11.

The resilient member 9 is arranged radially inwardly of the armature holder 11 and radially outwardly of a hub 12. Namely, the resilient member 9 is constructed by a tubular part 9-1 and a flange part 11b. The tubular part 9-1 contacts, at its outer cylindrical surface, with an inner cylindrical surface of the tubular part 11a of the holder 11 and, at its inner cylindrical surface, with an outer cylindrical surface of an outer tubular part 12a of the hub 12. The flange part 9-2 is, at its outer peripheral part, contacted with a rear surface of the flange part 11b, while the flange part 9-2 is, at its inner peripheral part, contacted with a rear surface of a flange part 12-1 of the hub. During assembly, the holder 11 and the hub 12 are arranged in a mold for the member 9, and a rubber material is introduced into the mold. Thus, after completion of the molding, an integrally connected construction of the elastic member 9, the holder 11 and the hub 12 is obtained. The elastic member 9 arranged between the holder 11 and the hub 12 is preferably made from a rubber material, such as chlorinated butyl rubber, acrylonitrile butadiene rubber, ethylene propylene rubber, which can provide a desired torque transmission capacity as well as torque variation absorbing capacity in the atmospheric temperature range for an automobile, such as between −30° to 120° C.

The hub 12 is made from a steel based material and further has a central sleeve portion 12b extending inwardly and integrally from the flange part 12-1. The central sleeve portion 12b has in inner spline 12b-1, with which a rotating shaft 100-2 of the compressor is fixed, under a spline engagement, for preventing the hub 12 from being relatively rotated with the rotating shaft 100-2 of the compressor. Furthermore, the hub 12 is formed with an opening 12b-2, through which a bolt 102 is, from the outer side, inserted and is screwed to the compressor shaft 100-2, which allows the hub 12 to be firmly connected to the compressor shaft 100-2.

In FIG. 1, a reference numeral 13 denotes a temperature fuse unit, which includes a temperature sensitive connecting element formed of an organic compound (resin) which melts at a predetermined temperature such as 184° C. and a pair of contacts (not shown) which are usually under an electrically contacted condition. Namely, below the melting temperature, the temperature fuse unit 18 maintains a condition that these contacts are electrically connected with each other. However, an increase in the temperature causes the temperature sensitive material to melt, which causes the contacts to be separated from each other under the action of a spring.

Specifically, the temperature fuse unit 13 is formed, generally, substantially as a circular cylindrical shape in which parts, such at a temperature sensing element, a contact mechanism and a spring are stored. As explained above, due to an occurrence of a locking of the compressor, the armature 8 is prevented from being rotated, so that a relative sliding movement of the rotor 2 with respect to the armature 8 is generated at an area where the rotor 2 and armature 8 are contacted with each other, which causes the temperature to be increased at the contact area. In other words, the temperature fuse unit 13 detects this temperature increase, which causes the closed circuit to be opened.

In view of this, it is necessary for an operation of the temperature fuse unit 13 that it quickly responds to an abnormal increase in a temperature which is generated by a sliding contact between the armature 8 and the rotor 2, which is generated during a locking of the compressor. Furthermore, it is also necessary that the fuse unit 13 is prevented from being erroneously operated by a heat which is generated from the electromagnetic clutch during normal operation of the compressor.

To comply with the above requirements, an arrangement of a location of the temperature fuse unit 13 is as follows in the first embodiment of the present invention. Namely, in a coil housing 4 formed as a double circular cylindrical shape constructed by the inner and outer rings 4a and 4b, the temperature fuse unit 13 is arranged at a location adjacent an outer cylindrical surface of the inner ring 4a and adjacent a rear end surface 2e of the rotor 2 which is located opposite the friction surface 2a. In particular, the temperature fuse unit 13 is embedded in the plastic cover 6 at a location adjacent its front end surface. In other word, the temperature fuse 13 is only covered by a portion of very small thickness among the entire thickness of the cover 6.

Figure 3:
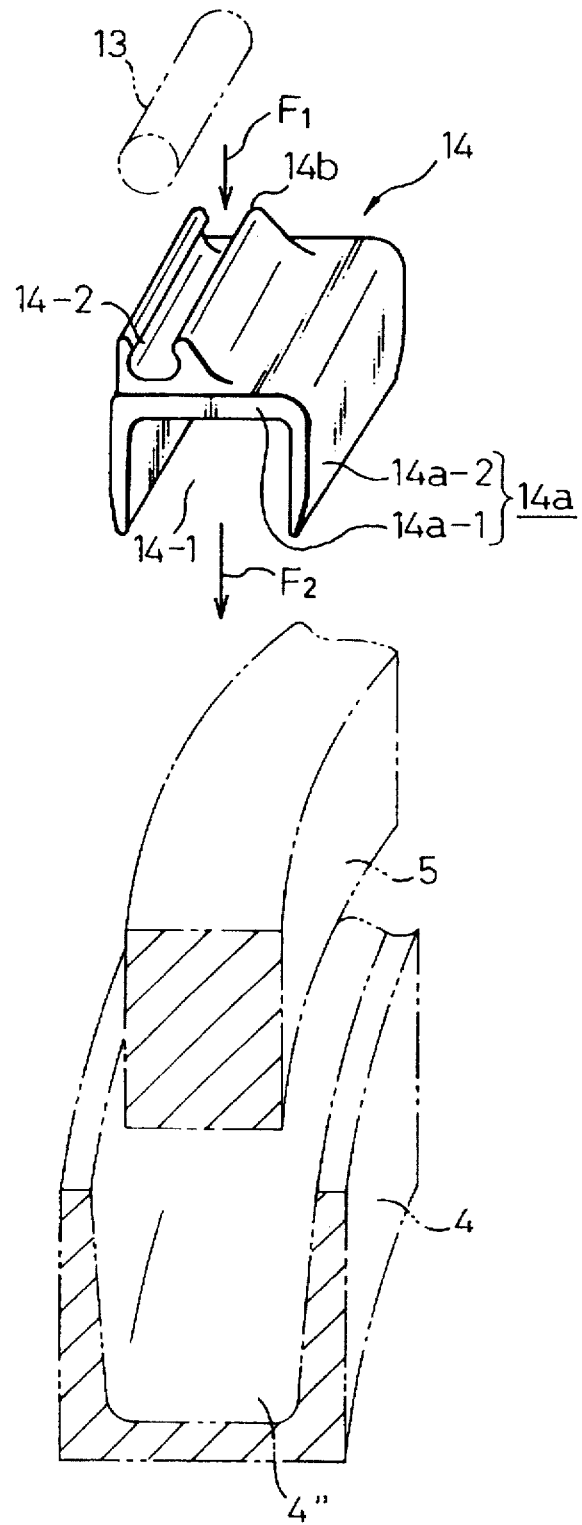
FIG. 3 is schematic perspective view of a fuse holder in FIGS. 1 and 2.

Now, a detail of construction for storing the temperature fuse unit 13 in the cover 6 will be explained. A reference numeral 14 denotes a holder for fixing the temperature fuse 13 at a place in the coil housing 4. As shown in FIG. 2, the holder 14 is located at a location along a circumference of the coil housing 4. The holder 14 is molded from a resin material and is, as shown in FIG. 3, constructed basically by a body 14a of a substantially C-cross sectional shape. Namely, the body 14a forms a base portion 14a-1, and a pair of side walls 14a-2 extending from the base portion 14a-1, so that a rearwardly opened channel 14-1 is formed between the portions 14a-1 and 14a-2, in which the coil 5 is partly stored as shown in FIG. 1. In FIG. 3, a pair of projections 14b is integrally extended from the base portion 14a-1 away from the side wall portions 14a-2, so that an undercut shaped channel 14-2 is formed. The temperature fuse unit 13 is inserted to the channel 14-2, while the lugs 14b are elastically displaced outwardly, so that the temperature fuse unit 13 is snap fitted to and firmly held by the undercut channel 14-2. Then, the coil 5 together with the holder 14 is inserted in place into the C-cross shaped channel 4" of the housing 4. Then, the resin material for constructing the cover 6 is charged and the molding is done as explained above. As for a material constructing the temperature fuse holder 14, a resin material is desirable that has a resistance to a high temperature generated from the electromagnetic coil 5, such as a nylon, polyphenylene surfide, and polybutylene terephtalate.

Figure 4:
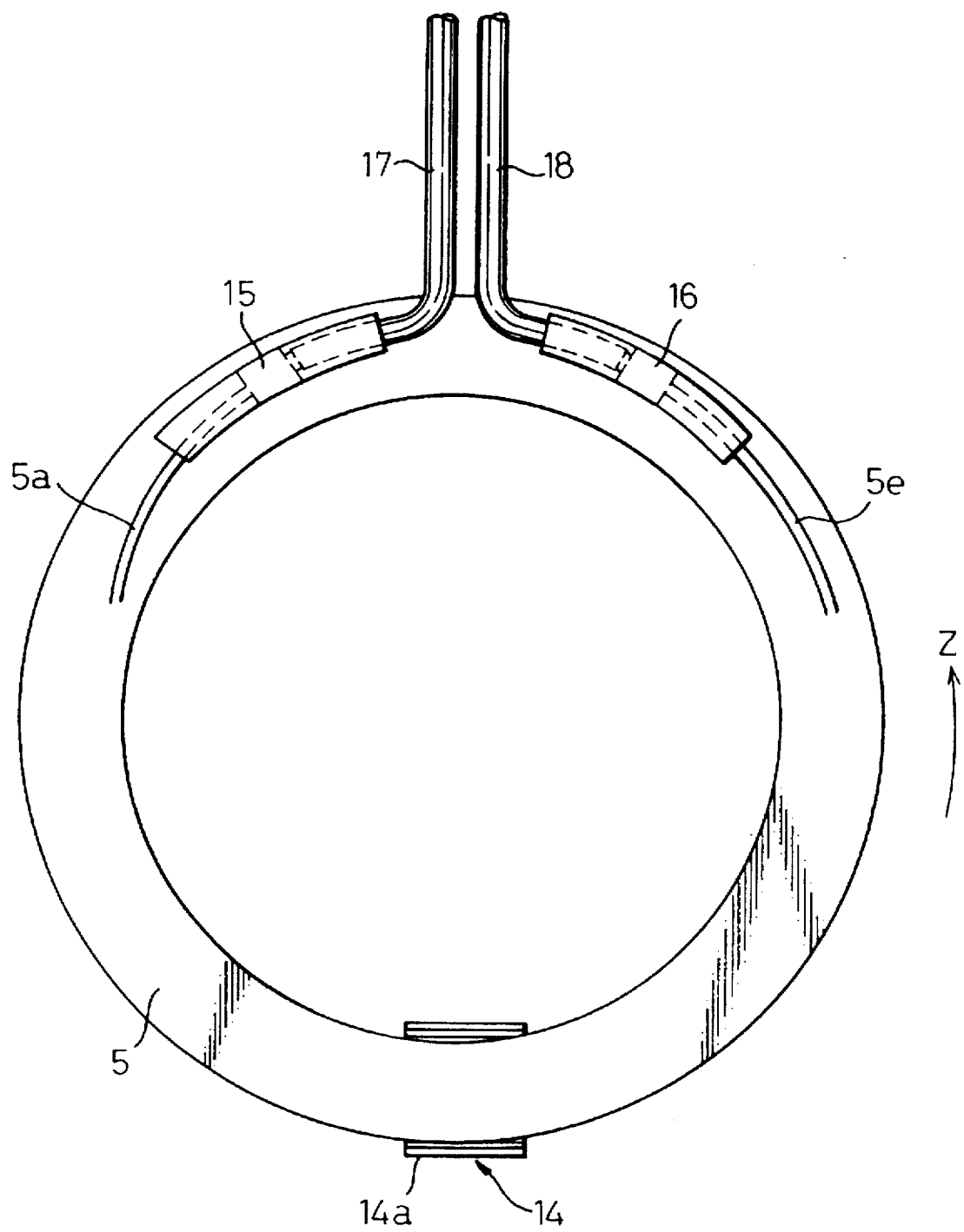
FIG. 4 is a rear view of a coil housing taken along line IV—IV in FIG. 1.
Figure 5:
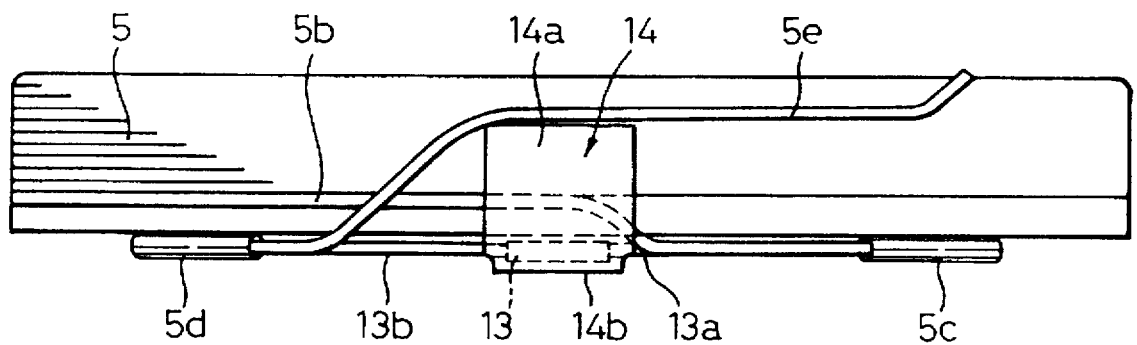
FIG. 5 is a top view of a electromagnetic coil taken along a line V in FIG. 2.

Now, an electrical connection of the electromagnetic coil 5 to an outer electric source will be explained. In, FIGS. 2, 4 and 5 the electromagnetic coil 5 has an end 5a (FIG. 4) on one side of the coil for commencing a winding of the coil in a direction as shown by an arrow z and an end 5b (FIG. 2) on the other side of the coil for finishing the winding. The latter end 5b is connected, via a first connector 5c, to a lead wire 13a at a first end of the temperature fuse unit 13. The temperature fuse unit 13 also has a second lead wire 13b which is connected, via a second connector 5d, to a lead wire 5e which is arranged to extend across the width of the coil 5 as shown in FIG. 5. As shown in FIG. 4, at the rear side of the coil 5 away from the temperature fuse 13, the lead wire 5a from the first end 5a of the coil 5 is connected to a first outer connection wire 17. The lead wire 5e from the second end 5b of the coil 5 is connected via the temperature fuse 13 to a second outer connection wire 18. These outer connection wires 17 and 18 are connected to an outside power source E in FIG. 6. An electrical as well as a mechanical connection at the connected points is done by a suitable means such as a soldering, fusing or crimping.

Figure 6:
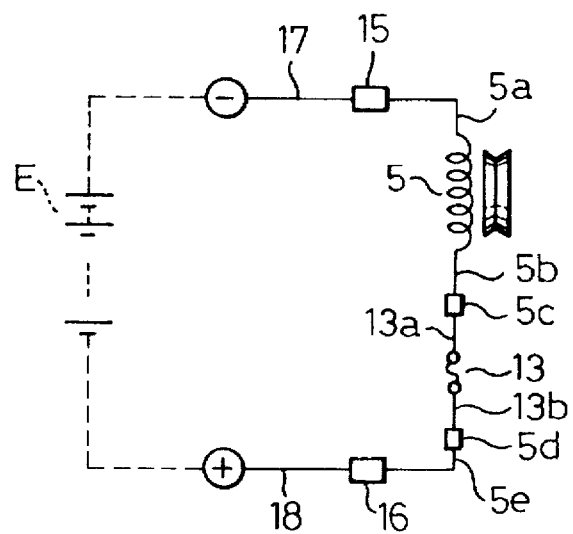
FIG. 6 is an electrical circuit of the electromagnetic coil in FIGS. 4 and 5.

FIG. 6 is a diagrammatic view illustrating an electrical connection of the temperature fuse 13 with the electromagnetic coil 5. Namely, the electromagnetic coil 5 and the temperature fuse 13 are in a series connection with the outside electric power source E.

Now, a process for assembling the electromagnetic coil 5 to the housing 4 will be explained. First, the electrical connection of the electromagnetic coil 5 with the temperature fuse 13 as explained with reference to FIGS. 2 to 4 is done. Namely, the first end 5a of the coil 5 on one side thereof is connected to the outside connecting wire 17 by means of the connector 15, while the second end 5b of the coil 5 on the other side is connected to the lead wire 13a of the fuse 13. Furthermore, the second lead wire 13b is connected to the connecting wire 5e via the second connector 5d. Furthermore, on the first side of the coil 5, the lead wire 5e is connected to the outside connecting wire 18 via the connector 16.

Then, the temperature fuse 13 of a generally circular rod shape is snap fitted to the channel 14-2 of the holder 14 as shown by a dotted arrow $F_1$ by elastically displacing the lugs 14b. Then, the C-cross sectional shaped holder 14 with the temperature fuse 13 is connected to the coil 5 as schematically shown by an arrow $F_2$ by inserting the coil 5 to the channel 14-1 of the holder. Then, the coil 5 together with the holder 14 as well as the temperature fuse 13 is inserted to the C-cross sectional shaped annular channel 4" of the housing 4. In this case, the fuse holder 14 takes a press fitted condition to the channel 4", which causes the temperature fuse 13 to take a predetermined location with respect to the housing 4. Namely, the temperature fuse 13 is located on a predetermined position along the circumference of the housing 4 as shown in FIG. 2.

Finally, an injection of a resin material 6 into the C-cross sectional shaped channel 4", of the housing 4, and the injected resin material 6 is molded, so that the electromagnetic coil 5, the temperature fuse unit 13 and the fuse holder 14 are firmly held in the housing 14 by means of the resin material 6. The resin material 6, which can be molded at a relatively low temperature between about 130° to about 140° C., which is effective for preventing the temperature fuse from being melted by the heat as generated during the molding process of the resin material 6.

Now, an operation of the first embodiment will be explained. During a normal compression operation, a rotating movement of the crankshaft of the internal combustion engine (not shown) is transmitted, via a belt (not shown), to the pulley 1. Thus, the rotor 2, which is integral with the pulley 1, is always rotated. In order to operate the air conditioning apparatus, a power supply circuit in FIG. 6 is closed, so that the electromagnetic coil 5 is energized, which creates a closed circuit of magnetic flux, from the coil 5, through the rotor 2, the armature 8 and the coil housing 4, and back to the coil 5. Due to the flow of the magnetic flux, an electromagnetic attraction force is generated between the frictional surface 2a of the rotor 2 and the armature 8, which causes the armature 8 to be moved toward and into face to face contact with the friction surface 2a of the rotor 2 against the elastic force of the spring 9 in the axial direction. As a result, an integral rotating movement of the armature 8 together with that of the rotor 2 is obtained, and the rotating movement of the armature 8 is transmitted, via the rivets 10, the holder 11 and the elastic member 9, to the hub 12. Thus, the drive shaft 100-2, which is in spline engagement with the hub 12, is subjected to the integral rotating movement, which causes the compressor 4 to effect a compressing operation. It should be noted that, during this normal operation of the compressor 4, the elastic member 9 functions to cancel a torque variation as generated by the operation of the compressor.

During the above mentioned normal compression operation by the compressor 4, heat is generated from the energized electromagnetic coil 5. According to the first embodiment of the present invention, the temperature fuse unit 13 is arranged at a location which is adjacent to the inner tubular portion 4a of the coil housing 4, so that the heat around the temperature fuse 13 is transmitted to the coil housing 4 made of a magnetizing material having a higher heat conductivity than the resin material constructing the cover 6. As a result, a reduced value of the temperature of the portion around the temperature fuse unit 13 is obtained when compared with a situation where the latter is situated in the middle of the resin material of a reduced heat conductivity as is the case in the prior art. Due to an effective emission of a heat from the electromagnetic coil, the chance of occurrence of erroneous melting of the temperature fuse 13 can be highly reduced.

An occurrence of a seizing of the compressor prevents the armature 8 from being rotated, thereby causing the rotor 2 to rotate while sliding on the armature 8. As a result, at the portion where such mutual sliding takes place between the armature 8 and the rotor 2, a temperature is highly increased. Due to the fact that the heat conductivity of the metal housing 4 is higher than that of the cover 6 made of the resin, the heat as generated by the temperature increase of the rotor 2 causes the temperature to be quickly increased at a portion of the housing 4 which is located adjacent to the front end surface 2e of the rotor 2, i.e., the end surface 4c of the inner and outer tubular portion 4a and 4b of the housing 4. As a result, the temperature fuse unit 13 is subjected to the heat from the rotor not only through the thin portion of the resin member 6 covering the temperature fuse unit 13 but also through the end 4c the inner sleeve portion 4a of the housing 4. As a result, a quick increase in the temperature fuse 13 is obtained in accordance with the increase in the temperature of the rotor 2. As a result, an occurrence of seizing of the compressor substantially instantly causes the temperature of the fuse 13 to be increased to its melting temperature, thereby causing it to open, thereby de-energizing the electromagnetic coil.

FIG. 7-(a) shows a part of the electromagnetic clutch in FIG. 1 and is for illustrating three locations A, B and C of the coil housing 4 faced with the end surface 2e of the rotor 2 where measurement of the temperature is done. FIG. 7-(b) illustrates the characteristic curves in a temperature change at these portions A, B and C when a temperature increase is occurred due to an occurrence of slippage in the clutch. In order to do this test, to the compressor, which was made previously locked, the clutch is connected. Then, the rotor 2 is rotated at 3,000 r.p.m., while the electromagnetic coil 5 is de-energized. Then, the electromagnetic coil 5 is energized, so that the clutch is engaged, which causes a slippage to occur due to the locked condition of the compressor. Under this condition, temperature measurements at the locations A, B and C are done. More specifically, as shown in FIG. 7-(a), the outer location A is 1.0 mm from the inner peripheral surface of the outer tubular part 4b of the housing 4 and 1.0 mm from the front end surface 4c of the housing 4. The middle location B is 7.0 mm from the outer peripheral surface of the inner tubular part 4a of the housing 4 and 1.0 mm from the front end surface 4c of the housing 4. The inner location C is 1.0 mm from the outer peripheral surface of the inner tubular part 4a of the housing 4 and 1.0 mm from the front end surface 4c of the housing 4. As will be clear from FIG. 7-(b), in comparison with the middle location B, an temperature increase at the outer or inner location A or C is much faster after an occurrence of slippage. This is because that the inner and outer tubular portions 4a and 4b of the coil housing 4 are effectively subjected to the heat via the end surface 4c, which causes the temperature of these portions to be quickly increased.

Now, a result of a test of the melting characteristic of the temperature fuse unit 13 according to the present invention will be explained. FIG. 8-(a) shows an arrangement of a temperature fuse unit 13 according to the present invention, while FIG. 8-(b) shows an arrangement of the same in a comparative test. Namely, in the present invention as shown in FIG. 8-(a), the temperature fuse unit 13 is arranged at a location 13A adjacent to the inner sleeve portion 4a of the coil housing 4 adjacent the rotor 2. Contrary to this, in the comparative test in FIG. 8-(b), the temperature fuse unit 13 is arranged at a location 13B in the middle portion between the inner and outer sleeve portions 4a and 4b. FIG. 8-(c) shows the relationship between the temperature of the temperature fuse unit 13 versus the lapse of time after a commencement of the slippage at the clutch. As a result of the test, it was found that the construction in the first embodiment of the present invention allows the temperature at the portion of the temperature fuse 13 to very quickly increase immediately after the occurrence of the slippage of the clutch. Namely, as shown in the solid curve in FIG. 8-(c), melting of the temperature fuse unit 13 occurs after an elapse of 76 seconds after the occurrence of the slippage at the clutch. In this case, the melting temperature of the temperature sensing element of the temperature fuse unit 13 is 184° C., while the melting temperature, where the closed circuit is in an opened condition at the temperature fuse unit 13, is 260° C. due to the effect of the delay.

In case of the comparative test in FIG. 8-(b), the speed of the temperature increase at the middle portion of the coil housing 4 is slow and an increase in the temperature is small, as shown by a dotted curve in FIG. 7-(b). Thus, a melting breakage of the temperature fuse unit 13 occurs only after an elapse of 115 seconds after the commencement of the slippage at the clutch, as shown by a dotted curve in FIG. 8-(c). In other words, an operating time of the temperature fuse is longer than that of the present invention. In the comparative test, where the temperature increase is small at the location of the housing 4, it is possible to shorten the operating time by using a temperature fuse element of a smaller value of a melting temperature. However, such a solution may cause the temperature fuse unit to be erroneously operated due to a heat as generated by the electromagnetic coil during a normal condition of the clutch where no seizing has occurred.

According to the result of tests in FIGS. 7-(a) and 7-(b) and FIGS. 8-(a) to 8-(c), it was found that, in order to prevent the temperature fuse unit 13 from being erroneously operated by the heat generated during normal conditions of the clutch, on one hand, and in order to increase a response speed of the temperature fuse unit 13 upon an occurrence of a slippage in the clutch, on the other hand, it is desirable that the temperature fuse unit 13 is arranged at regions of the rotor housing 4 as shown by fine hatched lines in FIG. 9. Specifically, a region is desirable, which is, in the cross section, delimited by a line which is located, at its maximum value, 5.0 mm from the outer peripheral surface of the inner sleeve portion 4a of the housing and by a line which is located, at its maximum value, 5.0 mm from the end surface 4c of the housing 4 adjacent the friction surface 2a of the rotor 2. A region is also desirable, which is, in the cross section, delimited by a line which is located, at its maximum value, 5.0 mm from the inner peripheral surface of the outer sleeve portion 4b of the housing and by a line which is located, at its maximum value, 5.0 mm from the end surface 4c of the housing 4 adjacent the friction surface 2a of the rotor 2. In short, it is desirable that the temperature fuse 13 is arranged at a location in the hatched region in FIG. 9 in to prevent the temperature fuse from being erroneously operated and in order to increase the response speed of the operation of the temperature fuse 13.

Second Embodiment

In the first embodiment of the present invention, the fuse holder 14 is constructed as a separate member for holding the temperature fuse unit 13 at a desired location of the coil housing 4. In place of such a separate construction, the fuse holder can be integrally formed with respect to a spool of the electromagnetic coil 5. Namely, in FIGS. 10-(a) to 10-(c) and 11, the spool 19 made of a resin material is for winding thereon the electromagnetic coil 5. Similar to the first embodiment, the spool 19 together with the electromagnetic coil 5 is arranged in a coil housing 4, as shown in FIG. 11. The spool 19 is formed as a ring member of a substantially C-cross sectional shape and is constructed by a sleeve portion 19-1, a first or front flange portion 19-2 and a second or rear flange portion 19-3. A fuse holder 14 extends integrally from the front flange 19-1 of the spool 19 and is formed with a groove 14-1 as shown in FIG. 10-(a). The temperature fuse unit 13 is fitted in the groove 14-1 in such a manner that the temperature fuse 13 is arranged adjacent the inner surface of the outer sleeve portion 4b of the coil housing 4 as shown in FIG. 11. The electrical connection of the coil 5 with the fuse unit 13 is the same as that explained in the first embodiment with reference to FIG. 6. Thus, its detail is omitted to avoid unnecessary repetition, while using the same numbers for the same parts (13a, 13b, 5b, 5c, 5d and 5e) as shown in FIGS. 10-(a) and 10-(b).

As explained above, in the second embodiment, the temperature fuse 13 is arranged in the coil housing 4 at a location adjacent the outer sleeve portion 4b. The arrangement of the temperature fuse 13 in the coil housing 4 at a location adjacent the outer sleeve portion 4b also allows the temperature fuse 13 to be quickly responsive to the increase in the temperature of the rotor 2 as generated by the slippage of the clutch as will be understood from the result of the test in FIGS. 7-(a) and 7-(b) and FIGS. 8-(a) and 8-(b). Thus, substantially the same advantage as that in the first embodiment is obtained.

Third Embodiment

A third embodiment is directed to an improvement in a service life of the lead wires 13a and 13b of the temperature fuse unit 13 when they are subjected to repeated heating and cooling. Namely, it is usual that the electromagnetic clutch of an air conditioning apparatus is arranged in an engine compartment of an automobile. In winter, a situation may occur that the engine compartment is at a temperature as low as about -30° C. when an internal combustion engine is in a stopped condition. Contrary to this, the engine compartment can increase to a temperature as high as about 120° C. when the engine is operating. As a result, the engine is subjected to a repeated cooling and heating. By such repeated heating and cooling, the resin member 6 made of a resin material such as an epoxy resin and molded in the housing 4 is subjected to a stress due to a difference in a temperature expansion factor between materials constructing the parts in the housing 4, which can cause a crack 60 to be generated in the resin member 6. Once such a crack 60 is generated, the resin member 6 is subjected to a shrinkage at a low temperature condition, which causes a stretching force to be generated in the lead wires 13a and 13b of the temperature fuse unit 13. Due to the stretching force, the connected portions between the lead wires 13a and 13b and the temperature fuse unit 13 and/or the lead wires 13a and 13b are themselves likely to be damaged, which, at worst, may cause the circuit of the temperature fuse unit 13 to be broken, which causes the clutch to be non-operable.

The third embodiment aims to prevent the lead wires 13a and 13b from being damaged or broken. Namely, as shown in FIGS. 13 and 14, protection tubes 13c and 13d are fitted to the lead wires 13a and 13b, respectively. The stretching load due to the shrinkage of the resin member 6 at the location of the crack causes the protection tubes 13c and 13d to be elongated, thereby relieving the stress in the lead wires 13a and 13b.

Specifically, when the diameter of the lead wires 13a and 13b is 0.7 mm, it was desirable that the protection tubes 13c and 13d have a diameter of 0.8 mm and a wall thickness of 0.4 mm. Furthermore, the protection tubes 13c and 13d is preferably constructed from a material maintaining its elasticity within a wide range of change in a temperature which occurs in an automobile. Preferably, a silicone tube, which is commercially available, can be employed.

During an assembly of the protection tubes 13c and 13d, the fitting of the protection tubes 13c and 13d to the lead wires 13a and 13b, respectively is done prior to connecting the wire 5b of the electromagnetic coil 5 with the lead wire 13a as well as prior to connecting the lead wire 13b with the lead wire 5e. Then, the crimping and soldering of the connecting sleeves 5c and 5d are done. Finally, wrapping of an electrically insulating tape about the connected portions 5c and 3d is done.

A crack 60 on the resin member 6 is, in many cases, generated at a location adjacent a side wall of the fuse holder member 14, as shown in FIG. 14. A width W of the fuse holder member 14 sufficiently larger than the length of the temperature fuse unit 13 can provide that the crack 60 generated in the resin member 6 is not located at the connector portion 13c or 13d but is located at the middle of the protection tube 13c or 13d, as shown in FIG. 14. As a result, the stretching load reduction function by the protection tube 13c or 13d of an increased degree can be obtained.

The durability of the protection tubes 13c and 13d was tested by the inventors by subjecting them to a repeated cooling and heating. It was affirmed that no damage occurred to the lead wires 13a and 13b.

Fourth Embodiment

A fourth embodiment is, similar to the third embodiment, directed to an increase of a service life of the lead wires 13a and 13b of the temperature fuse 13 due to repeated cooling and heating. In this fourth embodiment, as shown in FIGS. 15 and 16, the lead wires 13a and 13b have U-shaped loops 13e and 13f, respectively, at portions which are covered by the holder 14. Furthermore, in order to prevent a short circuit from being generated between the U-shaped portions 13e and 13f, the crossing of these portions 13e and 13f occurs where a predetermined space is left between the portions 13e and 13f. Namely, the fuse holder member 14 forms grooves 14c and 14d for holding the looped portions 13e and 13f, which functions to keep the portions spaced from each other. Furthermore, at locations spaced from ends where the wires 13a and 13b are extended out from the temperature fuse 13, the lead wires 13a and 13b are connected to the coil wire 5b and the lead wire 5e, respectively via the connectors 5c and 5d, respectively.

Due to the provision of the U-shaped looped portions 13e and 13f in the lead wires 13a and 13b, respectively, of the temperature fuse unit 13, shrinkage of the resin member 6 at the crack cannot cause a stretching load to be substantially increased due to the fact that the looped portions are stretched. Thus, the fourth embodiment is advantageous in that a provision of a member such as the protection tubes 13c and 13d is eliminated, while preventing the lead wires 13a and 13b from being damaged due to the repeated cooling and heating.

Fifth Embodiment

A fifth embodiment shown in FIG. 17 is a modification of the fourth embodiment. Namely, the lead wires 13a and 13b of the temperature fuse unit 13 form right angles 13h and 13g at portions covered by the holder 14. The provision of the portions 13h and 13g allow the stretching load to be reduced as generated by a shrinkage of the resin material 6 at the crack.

In the fourth and fifth embodiments, protection tubes 13c and 13d, as in the third embodiment (FIG. 14), can also be mounted to the lead wires 13a and 13b, which allows the load relaxing functions of the protection tubes to be combined with that of the looped portions 13e and 13f or bent portions 13g and 13h, thereby obtaining an increased load relaxing function.

While the above explanation is directed to application to a refrigerant compressor for an air conditioning apparatus for an automobile, the present invention can be applied in various field.

We claim:

1. An electromagnetic clutch for selective transmission of a rotating movement from a rotating movement source to a rotary apparatus having a rotating shaft comprising:

a first rotating member made of a magnetizing material and adapted to be subjected to a rotating movement from the rotating movement source, said rotating member forming a friction surface;

a second rotating member connected to the rotating shaft of the rotary apparatus;

an electromagnetic coil for generating an electromagnetic attraction force, the electromagnetic coil being located in an electrical circuit for energizing the electromagnetic coil for generating the electromagnetic attraction force when the circuit is closed;

a stationary housing made of a magnetizing material for fixedly storing therein the electromagnetic coil;

an armature made of a magnetizing material arranged so that the armature is attracted to the frictional surface of the first rotating member under the electromagnetic attraction force as generated;

a spring means arranged between the second rotating member and the armature for generating a spring force for causing the armature to be separated from the frictional surface of the first rotating member when the electromagnetic coil is de-energized;

a temperature fuse unit in said circuit, the temperature fuse unit being arranged in the stationary housing at a location adjacent the frictional surface of the first rotating member and also adjacent a wall of the stationary housing, melting of the fuse unit being generated at a temperature higher than a predetermined value, thereby opening the circuit and causing the electromagnetic coil to be de-energized; and a fuse holder member in the stationary housing for holding the temperature fuse, the fuse holder member holding the temperature fuse at a fixed location in the stationary housing.

2. An electromagnetic clutch according to claim 1, further comprising a spool for the electromagnetic coil, the spool being arranged in the coil housing, and the fuse holder member formed integrally with respect to said spool.

3. An electromagnetic clutch for selective transmission of a rotating movement from a rotating movement source to a rotary apparatus having a rotating shaft comprising:

a first rotating member made of a magnetizing material and adapted to be subjected to a rotating movement from the rotating movement source, said rotating member forming a friction surface;

a second rotating member connected to the rotating shaft of the rotary apparatus;

an electromagnetic coil for generating an electromagnetic attraction force, the electromagnetic coil being located in an electrical circuit for energizing the electromagnetic coil for generating the electromagnetic attraction force when the circuit is closed;

a stationary housing made of a magnetizing material for fixedly storing therein the electromagnetic coil;

an armature made of a magnetizing material arranged so that the armature is attracted to the frictional surface of the first rotating member under the electromagnetic attraction force as generated;

a spring means arranged between the second rotating member and the armature for generating a spring force for causing the armature to be separated from the frictional surface of the first rotating member when the electromagnetic coil is de-energized, and a temperature fuse unit in said circuit, the temperature fuse unit being arranged in the stationary housing at a location adjacent the frictional surface of the first rotating member and also adjacent a wall of the stationary housing, melting of the fuse unit being generated at a temperature higher than a predetermined value thereby opening the circuit and causing the electromagnetic coil to be de-energized, wherein said coil housing includes an inner and outer cylindrical portion and a disk portion connecting the cylindrical portion and a disk portion connecting the inner and outer cylindrical portions with each other so that the coil housing forms substantially a C-cross sectional shape, and wherein said temperature fuse is arranged at a location adjacent to the inner cylindrical portion.

4. An electromagnetic clutch according to claim 3, wherein said temperature fuse is arranged at a location of the stationary housing, wherein the location is in a range of distance equal to 5.0 mm or less from an outer peripheral surface of the inner cylindrical portion and equal to 5.0 mm or less from an end surface of the stationary housing adjacent to the frictional surface.

5. An electromagnetic clutch for selective transmission of a rotating movement from a rotating movement source to a rotary apparatus having a rotating shaft comprising:

a first rotating member made of a magnetizing material and adapted to be subjected to a rotating movement from the rotating movement source, said rotating member forming a friction surface;

a second rotating member connected to the rotating shaft of the rotary apparatus;

an electromagnetic coil for generating an electromagnetic attraction force, the electromagnetic coil being located in an electrical circuit for energizing the electromagnetic coil for generating the electromagnetic attraction force when the circuit is closed;

a stationary housing made of a magnetizing material for fixedly storing therein the electromagnetic coil;

an armature made of a magnetizing material arranged so that the armature is attracted to the frictional surface of the first rotating member under the electromagnetic attraction force as generated;

a spring means arranged between the second rotating member and the armature for generating a spring force for causing the armature to be separated from the frictional surface of the first rotating member when the electromagnetic coil is de-energized, and a temperature fuse unit in said circuit, the temperature fuse unit being arranged in the stationary housing at a location adjacent the frictional surface of the first rotating member and also adjacent a wall of the stationary housing, melting of the fuse unit being generated at a temperature higher than a predetermined value, thereby opening the circuit and causing the electromagnetic coil to be de-energized;

wherein said stationary housing includes an inner and outer cylindrical portion and a disk portion connecting the inner and outer cylindrical portions with each other so that the stationary housing forms substantially a C-cross sectional shape, and wherein said temperature fuse is arranged at a location adjacent the outer cylindrical portion.

6. An electromagnetic clutch according to claim 5, wherein said temperature fuse is arranged at a location of the stationary housing, which location is in a range of distance equal to 5.0 mm or less form an inner peripheral surface of the inner cylindrical portion and equal to 5.0 mm or less from an end surface of the stationary housing adjacent to the frictional surface.

7. An electromagnetic clutch for selective transmission of a rotating movement from a rotating movement source to a rotary apparatus having a rotating shaft comprising:

a first rotating member made of a magnetizing material and adapted to be subjected to a rotating movement from the rotating movement source, said rotating member forming a friction surface;

a second rotating member connected to the rotating shaft of the rotary apparatus;

an electromagnetic coil for generating an electromagnetic attraction force, the electromagnetic coil being located in an electrical circuit for energizing the electromagnetic coil for generating the electromagnetic attraction force when the circuit is closed;

a stationary housing made of a magnetizing material for fixedly storing therein the electromagnetic coil;

an armature made of a magnetizing material arranged so that the armature is attracted to the frictional surface of the first rotating member under the electromagnetic attraction force as generated;

a spring means arranged between the second rotating member and the armature for generating a spring force for causing the armature to be separated from the frictional surface of the first rotating member when the electromagnetic coil is de-energized; and a temperature fuse unit in said circuit, the temperature fuse unit being arranged in the stationary housing at a location adjacent the frictional surface of the first rotating member and also adjacent a wall of the stationary housing, melting of the fuse unit being generated at a temperature higher than a predetermined value, thereby opening the circuit and causing the electromagnetic coil to be de-energized;

wherein the temperature fuse unit includes lead wires for an outside electrical connection and wherein it further comprises covering tubes for covering the lead wires for relaxing a stretching force from a resin member.

8. An electromagnetic clutch according to claim 7, wherein it further comprises a fuse holder member in the stationary housing for holding the temperature fuse, the fuse holder member holding the temperature fuse at a fixed location in the stationary housing, and wherein said fuse holder is in an overlapped relationship with reference to covering tubes.

9. An electromagnetic clutch for selective transmission of a rotating movement from a rotating movement source to a rotary apparatus having a rotating shaft comprising:

a first rotating member made of a magnetizing material and adapted to be subjected to a rotating movement from the rotating movement source, said rotating member forming a friction surface;

a second rotating member connected to the rotating shaft of the rotary apparatus;

an electromagnetic coil for generating an electromagnetic attraction force, the electromagnetic coil being located in an electrical circuit for energizing the electromagnetic coil for generating the electromagnetic attraction force when the circuit is closed;

a stationary housing made of a magnetizing material for fixedly storing therein the electromagnetic coil;

an armature made of a magnetizing material arranged so that the armature is attracted to the frictional surface of the first rotating member under the electromagnetic attraction force as generated;

a spring means arranged between the second rotating member and the armature for generating a spring force for causing the armature to be separated from the frictional surface of the first rotating member when the electromagnetic coil is de-energized;

a temperature fuse unit in said circuit, the temperature fuse unit being arranged in the stationary housing at a location adjacent the frictional surface of the first rotating member and also adjacent a wall of the stationary housing, melting of the fuse unit being generated at a temperature higher than a predetermined value, thereby opening the circuit and causing the electromagnetic coil to be de-energized;

wherein the temperature fuse unit includes lead wires for an outside electrical connection and the lead wires have bent portions for relaxing a stretching force from a resin member.

10. An electromagnetic clutch according to claim 9, wherein said bent portion is a loop formed in the corresponding wire.

11. An electromagnetic clutch according to claim 10, further comprising a fuse holder member in the stationary housing for holding the temperature fuse, the fuse holder member having grooves for holding the loops in the wires.

12. An electromagnetic clutch according to claim 9, wherein said bent portion is a right angle portion in the corresponding wire.

* * * * *